United States Patent [19]

Kertscher et al.

[11] 4,145,474

[45] Mar. 20, 1979

[54] METHOD OF MANUFACTURING INSULATED ELECTRIC WIRE OF THE ENAMELLED-WIRE TYPE BY EXTRUSION

[75] Inventors: Eberhard Kertscher, Romanel, Switzerland; Harald Janssen, Hamburg, Fed. Rep. of Germany

[73] Assignees: Maillefer S.A., Ecublens, Switzerland; Dr. Beck & Co. AG, Hamburg, Fed. Rep. of Germany

[21] Appl. No.: 811,364

[22] Filed: Jun. 29, 1977

[30] Foreign Application Priority Data

Jul. 1, 1976 [CH] Switzerland ........................ 8445/76

[51] Int. Cl.$^{2}$ ................................................ B29F 3/10

[52] U.S. Cl. .................................... 428/379; 264/174; 427/117; 427/120; 428/458

[58] Field of Search .................. 264/174; 156/244, 51; 427/117, 120; 428/458, 379

[56] References Cited

U.S. PATENT DOCUMENTS

| | | | |
|---|---|---|---|
| 3,313,781 | 4/1967 | Beck et al. | 428/458 |
| 3,577,346 | 5/1971 | McKeown | 428/458 |
| 3,669,738 | 6/1972 | Cottis et al. | 427/120 |
| 3,829,545 | 8/1974 | Van Vlaenderen | 264/174 |
| 3,914,363 | 10/1975 | Bedard et al. | 264/174 |
| 4,058,640 | 11/1977 | Jung et al. | 427/118 |

FOREIGN PATENT DOCUMENTS

| | | | |
|---|---|---|---|
| 1720321 | 6/1971 | Fed. Rep. of Germany | 264/174 |
| 2022802 | 11/1971 | Fed. Rep. of Germany | 264/174 |
| 2110934 | 6/1973 | Fed. Rep. of Germany | 264/174 |
| 2135157 | 7/1973 | Fed. Rep. of Germany | 264/174 |

*Primary Examiner*—Jeffery R. Thurlow
*Attorney, Agent, or Firm*—Michael J. Striker

[57] ABSTRACT

A method of extruding a thin sheath of plastic material about electric wire, utilizing a plastic material capable of being shaped by extrusion after having been heated in a screw extruder, this material exhibiting the technical characteristics required for enamel-type insulation after cooling, without necessitating subsequent treatment. An extrusion material containing at least one partially crystalline thermoplastic polycondensate wherein the crystallites have a melting-point above 170° C. answers these requirements.

9 Claims, No Drawings

METHOD OF MANUFACTURING INSULATED ELECTRIC WIRE OF THE ENAMELLED-WIRE TYPE BY EXTRUSION

This invention relates to a method of manufacturing insulated electric wire of the enamelled-wire type by extrusion of a thermoplastic material.

What is called "insulated electric wire of the enamelled-wire type" is wire which is intended to be used in producing windings for electrical apparatus such as motors, transformers, magnetic coils, or other electrical components intended to operate under load conditions such that their temperature is higher than the ambient temperature. For reasons of space-saving and economy, the sheath of insulating material covering such wire should be as thin as possible, while for reasons of durability and reliability, the insulating material should be stable at the operating temperature.

The requirements which must be met by such wire are laid down in certain standard specifications. According to the German Industrial Standards, for example, these requirements are set forth particularly in DIN Sheets 46435 and 46416.

The traditional method of manufacture utilized for wire having enamel-type insulation consists in preparing a solution of an organic synthetic resin in a suitable solvent. This liquid is placed in receptacles through which the wire passes. A film of liquid is then deposited on the surface of the wire. This method requires a subsequent treatment operation to remove the solvent. Moreover, it necessitates several successive passages of the wire through the bath of insulating material in order to obtain the required thickness of insulation. Finally, the speed at which the wire travels is necessarily limited to a rate on the order of several meters per minute.

In order to avoid the difficulties resulting from the use of toxic solvents, it has been sought to use insulating materials combined with water. Thus German Published applications Nos. 2,351,078 and 1,720,321 propose the use of resins dispersed or dissolved in water. This method, however, requires a drying operation in which the water is evaporated, thus involving consumption of a large amount of energy. Furthermore, the choice of additives compatible with water likewise involves new difficulties.

In order to avoid the drawbacks of this traditional system, especially the detrimental effects on the environment caused by the burning or evaporation of the solvent and the waste of energy involved in this operation, it has already been sought to replace the soluble resins used heretofore by synthetic materials capable of being heated without deterioration up to a temperature above that which the insulating material must withstand during operation. According to German Disclosed Application (DOS) No. 2,135,157, the plastic material is contained in a bath heated to a temperture above the melting-point. However, this method is delicate to carry out owing to the high tempertures required. It is slow, and it also leads to waste of material when an operation must be interrupted, for the remainder of the material still contained in the receptacle is then generally lost.

German Published application No. 2,022,802 discloses a method of manufacturing insulated electric wire, the insulation of which withstands high temperatures, by means of extrusion utilizing cross-linkable thermoplastics which, after formation of the sheath surrounding the wire to be insulated, undergo hardening by electronic radiation or by a heat-treatment. The products proposed in this disclosure, however, do not provide insulation answering the requirements set forth in the above-mentioned standards, so that this method does not furnish an effective solution to the problem posed. Until now, despite these endeavors, it has not been considered possible to produce enamel-insulated electric wire by extrusion.

However, a careful study of the problem has led to the discovery that contrary to the generally accepted opinion, certain known thermoplastic materials can be used under efficient working conditions to form an enamel insulation on wire of about 1 mm. in diameter by means of a high-temperature extrusion operation, and that this new method makes it possible to avoid all the drawbacks encountered in the prior art methods.

Since the thermoplastics proposed for use in the method according to the present invention do not contain any solvents or toxic substances, the application of this method requires neither burning equipment nor any special measures to safeguard the health of the operating personnel. Since it also avoids any drying operation to evaporate water and the attendant expenditure of energy, this method therefore fully complies with environmental protection regulations.

The new method makes it possible to deposit a layer of insulation corresponding to the specifications of DIN 46435 in a single operation. This also applies when it is desired to produce wire having reinforced insulation (type 2L according to the aforementioned DIN standard). For copper wire 1 mm. in diameter, the layer of insulation for type 2L is supposed to be from 30 to 47 microns thick.

The thermoplastic polycondensates utilized in the method according to this invention require no hardening operation, thus contributing to the saving in energy.

The use of extrusion makes possible a considerable increase in the speed of withdrawal and, consequently, in the efficiency of the method. As will be seen below, when using wire 1 mm. in diameter, it is possible to achieve speeds of about 500 m./min., i.e., about twenty times the speeds known heretofore.

The method according to the present invention displays its advantages when used in conjunction with an extrusion method and apparatus which are distinguished from the prior art methods and apparatus and are described in co-pending Application Ser. No. 811,362 (corresponding to Swiss Patent application No. 8446/76) entitled "Method and Apparatus for Manufacturing Electric Wire Having Wire-Enamel-Type Insulation." This co-pending application discloses a method wherein a high-melting-point synthetic resin is heated to a temperature at least as high as the melting-point thereof, and a thin sheath of this resin is formed about the wire, and comprises the steps of passing the wire through an extrusion unit, forcing the heated resin into the extrusion unit, and pressing the resin about the wire within the extrusion unit. The apparatus for carrying out this method comprises a screw extruder having an outlet orifice, an extrusion head secured to this orifice, and one or more extrusion units forming part of the extrusion head and each including a gauging die having compressing means.

According to the present invention, there is provided a method of manufacturing insulated electric wire of the enamelled-wire type by extrusion of a thermoplastic material containing at least one partially crystalline thermoplastic polycondensate comprising crystallites having a melting-point above 170° C. Preferably, the melting-point of the crystallites is above 250° C.

Preferred embodiments of the invention will be discussed in detail below with reference to examples of ways in which it may be carried out. First of all, examples will be given of thermoplastic polycondensates suitable for use in this method.

The term "thermoplastic polycondensate" is understood to mean a thermoplastic synthetic material produced by a process of polycondensation.

1. Linear polyesters of high molecular weight formed from aromatic dicarboxylic acids and unbranched diprimary aliphatic diols, e.g., polyethylene terephthalate, polybutylene terephthalate polyethylene naphthoate.

These products are produced starting from terephthalic acid, from dimethyl terephthalate, from 2,6-naphthalene dicarboxylic acid, and ethylene glycol, 1,4-butanediol, respectively.

2. Polyarylesters. These products are likewise linear polyesters formed from aromatic dicarboxylic acids. Preferably used are terephthalic acid, terephthalic diphenyl esters or dichlorides and diphenols, preferably without aliphatic substituents or link segments. They may also be formed from the corresponding oxycarboxylic acids, e.g., poly-(p-hydroxybenzoates).

3. Linear aliphatic polyamides having high molecular weight formed from unbranched alliphatic dicarboxylic acids and from likewise unbranched diprimary aliphatic diamines, e.g., 6,6-polyamide (adipic acid, hexamethylene diamine) or 6,10-polyamide (sebacic acid, hexamethylene diamine).

4. Linear aliphatic polyamides of high molecular weight from lactams, e.g., 6-polyamide (polycaprolactam) or 12-polyamide (polylaurolactam).

5. Linear aliphatic polyamides of high molecular weight from $\alpha,\omega$-aminocarboxylic acids, e.g., polyamide 11 (polyamide of $\omega$-amino-undecenoic acid).

6. Linear araliphatic polyamides of high molecular weight from aromatic dicarboxylic acids or their functional derivatives and unbranched aliphatic diprimary diamines or corresponding aliphatic dicarboxylic acids and aromatic diamines. Examples:

- Polyamides of terephthalic acid and hexamethylene diamine (1,6)
- Polyamides of terephthalic acid and ethylene diamine
- Polyamides of terephthalic acid and nonamethylene diamine
- Polyamides of terephthalic acid and decamethylene diamine
- Polyamides of adipic acid and p-phenylene diamine.

7. Aramides, polyamides formed from aromatic dicarboxylic acids or their functional derivatives and aromatic diamines, e.g., from terephthalic acid and p-phenylene diamine or from isophthalic acid and m-phenylene diamine.

8. Sulfur polymers such as polyphenylene sulfide.

Obviously, only high-melting-point polymers which soften and melt without significant decomposition will be used. In cases where very high-melting-point thermoplastics are used, it is quite within the concept of the method according to the present invention to bring about a disaggregation of the crystalline structure and, consequently, a lowering of the melting-point, by co-condensation with monomers having another structure. Thus, for example, in order to obtain a layer of insulation of a pure polyarylester having a very high melting-point, aliphatic structure elements may be added to the starting substances.

In the case of araliphatic polyamides which have a very high melting-point or which do not melt without decomposition, it is likewise possible, for example, to replace some of the unbranched aliphatic diprimary diamines by diamines having side groups, Thus, for example, part of the hexamethylene diamine (1,6) may be replaced by trimethylhexamethylene diamine, or part of the aromatic dicarboxylic acid may be replaced by aliphatic dicarboxylic acid.

These possibilities of modification are correspondingly applicable to all the groups of materials mentioned above. It will be obvious that polymers having too high a melting-point may, for the purpose of lowering their melting-point, be mixed with more or less large quantities of low-melting-point thermoplastics; for example, the polyamide of terephthalic acid and hexamethylene diamine may be mixed with a polyamide of terephthalic acid and trimethylhexamethylene diamine. However, other structures also enter into consideration to the extent that they are compatible with the resins cited above. It may also prove useful to mix small quantities of other materials with the above-mentioned thermoplastics, e.g., auxiliary agents intended to produce certain special effects. Thus, for example, in certain cases, it may be useful to add resins intended to improve the flow of the material, e.g., silicone resins.

The addition of coloring agents or pigments may likewise be useful since, in practice, it is quite often desired to produce enamel-insulated wires having a colored insulating sheath.

The products mentioned above have been tested in their application to the manufacture of electric wires having enamel-type insulation under various operating conditions, utilizing the method and apparatus described in the co-pending application referred to earlier.

Details will now be given concerning the substances used, the manner in which the tests were carried out, and the results obtained.

GENERAL INDICATIONS:

In all of the following examples, the wire used was annealed round copper wire having a diameter of 1 mm. in Examples 1 and 2 and a diamter of 0.6 mm. in Example 3.

The extrusion temperatures indicated refer to temperatures measured at various points along the route from the inlet of the extruder to the exit die. The last three values apply to the die system.

The thicknesses of insulation correspond to double-insulated wire (type 2L), the manufacture of which by conventional methods is particularly delicate, especially as concerns achieving a satisfactory surface.

As for the characteristics of insulated winding wire which are given below, viz., softening temperature, hardness, adhesion, and peel test, reference is made to DIN Standard 46453, Sheet 1, where these terms are defined.

EXAMPLE 1

| | |
|---|---|
| Insulating material: | Polyethylene terephthalate (PETP) |
| K value: | 61 relative viscosity 1.459) |
| Melting-point: | DTA 256° C. |
| Processing conditions: | |
| Extrusion temperatures: | 200 -240 -270 -280 -290 -315 -320° C. |

-continued

| | |
|---|---|
| Withdrawal speed: | 20–400 m./min. |
| Thickness of sheath: | 32–50 microns |
| Properties of the insulated wire: | |
| Hardness: | 1-14 2H |
| Softening temperature: | 225–245° C. |
| Peel test: | 190–260 rpm |
| Surface condition: | smooth, substantially free of blisters and extrusion marks |

EXAMPLE 2

| | |
|---|---|
| Insulating material: | 6,6-polyamide |
| Trade name: | "ULTRAMIDE A4H" (BASF) |
| Melting-point: | 255° C. |
| Processing conditions: | |
| Extrusion temperatures: | 240–260–280–290–290–290–290° C. |
| Withdrawal speed: | 25–320 m./min. |
| Thickness of sheath: | 34–40 microns |
| Properties of the insulated wire: | |
| Hardness: | 1-3H |
| Softening temperature: | 205–215° C. |
| Peel test: | 100–225 rpm |
| Surface condition: | smooth, substantially free of blisters and extrusion marks |

EXAMPLE 3

| | |
|---|---|
| Insulating material: | Polyphenylene sulfide |
| Trade name: | "RYTON" (Philips Petroleum) |
| Melting-point: | DTA 280° C. |
| Processing conditions: | |
| Extrusion temperatures: | 240–270–295–315–320° C. |
| Withdrawal speed: | 50–500 m./min. |
| Thickness of sheath: | 20–25 microns |
| Properties of the insulated wire: | |
| Hardness: | H to 1H |
| Softening temperature: | 260° C. |
| Peel test: | 100–200 rpm |
| Surface condition: | smooth, free of blisters and extrusion marks, breakdown voltage 11.5 kv. |

Generally speaking, the method described is applicable for wire having a metal core between 0.1 and 4.0 mm. in diameter.

What is claimed is:

1. A method of manufacturing insulated electric wire of the enamelled wire type intended to be used in the manufacture of windings for electrical equipment such as motors, transformers, magnetic coils, relays and the like required to operate under load conditions wherein their temperature is elevated above the ambient temperature, comprising the steps of introducing into an extruder a solvent free thermoplastic material containing at least one partially crystalline thermoplastic polycondensate comprising crystallites having a melting point above 170° C.and extruding at or above the crystalline melting point of said thermoplastic polycondensate, the molten material onto and around a metal wire so as to form on said wire a thin sheath having a thickness complying with the requirements of German Standard DIN 46 435.

2. A method according to claim 1, wherein said crystallites have a melting point above 250° C.

3. A method according to claim 1, wherein said thermoplastic polycondensate is selected from the group consisting of linear polyesters formed from aromatic dicarboxylic acids and unbranched diprimary aliphatic diols; polyarylesters; linear aliphatic polyamides formed from unbranched aliphatic dicarboxylic acids and unbranched diprimary aliphatic amines; linear aliphatic polyamides formed from lactams; linear aliphatic polyamides formed from $\alpha,\omega$-aminocarboxylic acids; linear araliphatic polyamides formed from aromatic dicarboxylic acids, functional derivatives thereof and unbranched aliphatic diprimary diamines; aramides formed from aromatic dicarboxylic acids, their functional derivatives and aromatic diamines; and sulfur containing polymers.

4. A method according to claim 1, wherein said solvent free thermoplastic material additionally contains an auxiliary agent selected from the group consisting of flow improving materials and coloring agents.

5. A method according to claim 1, wherein said thermoplastic polycondensate is polyethylene terephthalate.

6. A method according to claim 1, wherein said thermoplastic polycondensate is 6,6-polyamide.

7. A method as defined in claim 1, wherein said thermoplastic polycondensate is polyphenylene sulfide.

8. The insulated electric wire produced by the process of claim 1.

9. A method as defined in claim 1, wherein said sheath has a thickness of less than about 5% of the diameter of said wire.

* * * * *